United States Patent [19]

Vander Kamp et al.

[11] Patent Number: 5,418,918

[45] Date of Patent: May 23, 1995

[54] SCANNING INITIAL CD-ROM SECTORS FOR A BOOT RECORD AND EXECUTING SAID BOOT RECORD TO LOAD AND EXECUTE FLOPPY DISK IMAGE CORRESPONDING TO THE EXISTING FLOPPY DRIVE

[75] Inventors: Kerry B. Vander Kamp; Roberta W. Hensley, both of Houston; Curtis R. Jones, Cypress, all of Tex.

[73] Assignee: Compaq Computer Corp., Houston, Tex.

[21] Appl. No.: 119,984

[22] Filed: Sep. 10, 1993

[51] Int. Cl.⁶ .......................... G06F 9/24; G06F 9/445
[52] U.S. Cl. ..................... 395/375; 395/700; 364/DIG. I; 364/DIG. II
[58] Field of Search ................ 395/325, 575, 600, 700, 395/725, 375

[56] References Cited

U.S. PATENT DOCUMENTS

| | | | |
|---|---|---|---|
| 5,093,915 | 3/1992 | Platteter et al. | 395/700 |
| 5,146,568 | 9/1992 | Flaherty et al. | 395/325 |
| 5,210,875 | 5/1993 | Bealkowski et al. | 395/700 |
| 5,247,659 | 9/1993 | Curran et al. | 395/575 |
| 5,274,816 | 12/1993 | Oka | 395/700 |

OTHER PUBLICATIONS

Jex, Jerry. "Flash Memory BIOS for PC and Notebook Computers", 1991, pp. 692–695.
ISO 9660 Standard, International Organization for Standardization, Sep. 1, 1988, pp. 1–31.

*Primary Examiner*—Parshotam S. Lall
*Assistant Examiner*—Zarni Maung
*Attorney, Agent, or Firm*—Pravel, Hewitt, Kimball & Krieger

[57] ABSTRACT

A computer system capable of booting currently manufacturable CD-ROMs or tapes without altering the ISO standard or requiring special, customized software to perform this function. A CD-ROM developed for booting according to the present invention contains a boot record as defined by the ISO but located at the end of the defined system area. The operating code of the computer scans for a boot record starting at the beginning sector of the CD-ROM and ending at either a default number or the volume descriptor terminator. The floppy disk boot images are contained at the end of the primary volume space and incorporated in the primary volume space, not external to the primary volume space as in the ISO standard. Boot code contained in the boot record determines the size of the volume, and the proper floppy image to be used and then the actual location of the floppy image. Booting of the system then commences using the floppy image.

11 Claims, 15 Drawing Sheets

SCANNING INITIAL CD-ROM SECTORS FOR A BOOT RECORD AND EXECUTING SAID BOOT RECORD TO LOAD AND EXECUTE FLOPPY DISK IMAGE CORRESPONDING TO THE EXISTING FLOPPY DRIVE

BACKGROUND OF THE INVENTION

1. Field of the Invention

The invention relates to computer systems which boot from various media, and more particularly to a computer system which can boot from alternate SCSI media such as CD-ROM and tape drives, particularly when the operating system is MS-DOS.

2. Description of the Related Art

It has been conventional for personal computers to boot from various media, for example a floppy disk drive or a hard disk drive. In certain cases personal computers can also boot from external locations, such as over a network or over parallel or serial ports. Generally, the order of trying the various sources is a fixed arrangement, such as the external boot location, the floppy drive and finally the first hard drive. In certain cases, bypassing of the floppy drive has been provided to allow certain security features.

One trend in the personal computer field is the ever increasing size of programs, including diagnostic programs, configuration programs and application programs. The diagnostic programs are getting longer because they must generally handle a very large number of systems, as new systems are developed, and because the systems are getting significantly more complex. As to configuration, with the development of programs such as EISA CONFIG, which is a configuration utility used for EISA computers, it is also standard to include a very large number of standard board setup or configuration files. As time passes, the number of files with the utility continues to increase, so that the user need not necessarily find the actual floppy disk that came with the circuit board, but can just consult the table provided with the utility. So as more boards are produced, the number of configuration files continues to increase, easily exceeding the capacity of a single floppy disk drive.

The third problem is the ever growing size of operating system and application programs. As the computers have become more powerful and better user interfaces and additional functionality have been demanded, the program sizes have dramatically increased. In many cases 10 to 20 1.44 MB floppy diskettes are required to contain the copy of the program to be loaded onto the computer's hard disk for use thereafter. And the program files on these diskettes have already been compressed.

All of these trends have resulted in a need for a growing number of floppy disks which are quite cumbersome, expensive, bulky and subject to accidental erasure. Therefore some avenue is considered desirable to greatly reduce the logistical difficulties of a user running diagnostics or configuration programs or installing applications or operating systems.

The first thought that would immediately come to mind would be the use of CD-ROMs to contain these programs. To this end, the International Standards Organization (ISO) has developed standards for data on CD-ROMs. This includes an area reserved for the manufacturer; a primary volume descriptor, which is a block which indicates the size of the actual data stored on the CD-ROM drive; an ISO defined boot record; several ISO defined volume partition descriptors; and a volume descriptor terminator. The volume descriptor terminator is followed by the primary volume space, which includes any volume partitions, such as the main volume, and any additional volumes, such as a 1.44 MB floppy image and a 1.2 MB floppy image. While this would appear to solve the problem, it does not. The reason is that there is no manufacturing support for preparing a bootable ISO CD-ROM and there is no software which recognizes an ISO-standard bootable CD-ROM. Systems are not available to write data to the various locations specified by the ISO for the boot record, the various volume partition descriptors, and the volume descriptor terminator. Available systems can only write to the system area, the primary volume descriptor and the primary volume space. As a result, while there is a specification, it is not possible to actually develop a CD-ROM which is bootable according to the ISO standard. A second problem is that any additional devices are not in the boot order in a standard computer. It is also desirable to limit any changes made to incorporate booting from a CD-ROM drive so that the various conventional routines, commonly BIOS interrupts, which are utilized in the computer do not need to be redefined but can continue to remain compatible with present functions while being extended for new capabilities. It is also desirable that several variations of CD-ROM organizations be capable of being utilized for booting.

SUMMARY OF THE INVENTION

A computer system according to the present invention is capable of booting currently manufacturable CD-ROMs without altering the ISO standard or requiring special, customized software to perform this function and can also boot from tape.

A CD-ROM developed for booting according to the present invention contains a boot record as defined by the ISO but within the defined system area. The system area is readily writable by the systems used in developing CD-ROMs and so this boot record location can be utilized. The operating code of the computer is developed to scan for a boot record starting at the beginning sector of the CD-ROM and ending at either a default number or the volume descriptor terminator, so that should an ISO standard CD-ROM actually be developed it would also be bootable. The floppy disk boot images are contained at the end of the primary volume space and incorporated in the primary volume space. Boot code contained in the boot record determines the size of the volume, and the proper floppy image to be used and then the actual location of the floppy image. Booting of the system then commences using the floppy image.

As it is assumed that booting is being done from a floppy drive, all calls are done using the conventional floppy drive interrupt routines as conventionally available in personal computers. The interrupt routines are slightly modified to determine if redirection is being requested to the CD-ROM for the particular booting operation. If so, then the interrupts execute routines developed for use with the CD-ROM drives. Conventional operations with the floppy drive are not redirected and are handled without interference. Additional code provided by the CD-ROM manufacturer is not required.

Thus in this manner a computer according to the present invention is readily able to boot off of a CD-ROM using available systems to develop the CD-ROMs and without undue development or new or customized driver code for the particular function. Additionally, a SCSI tape drive can also act as the boot source.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
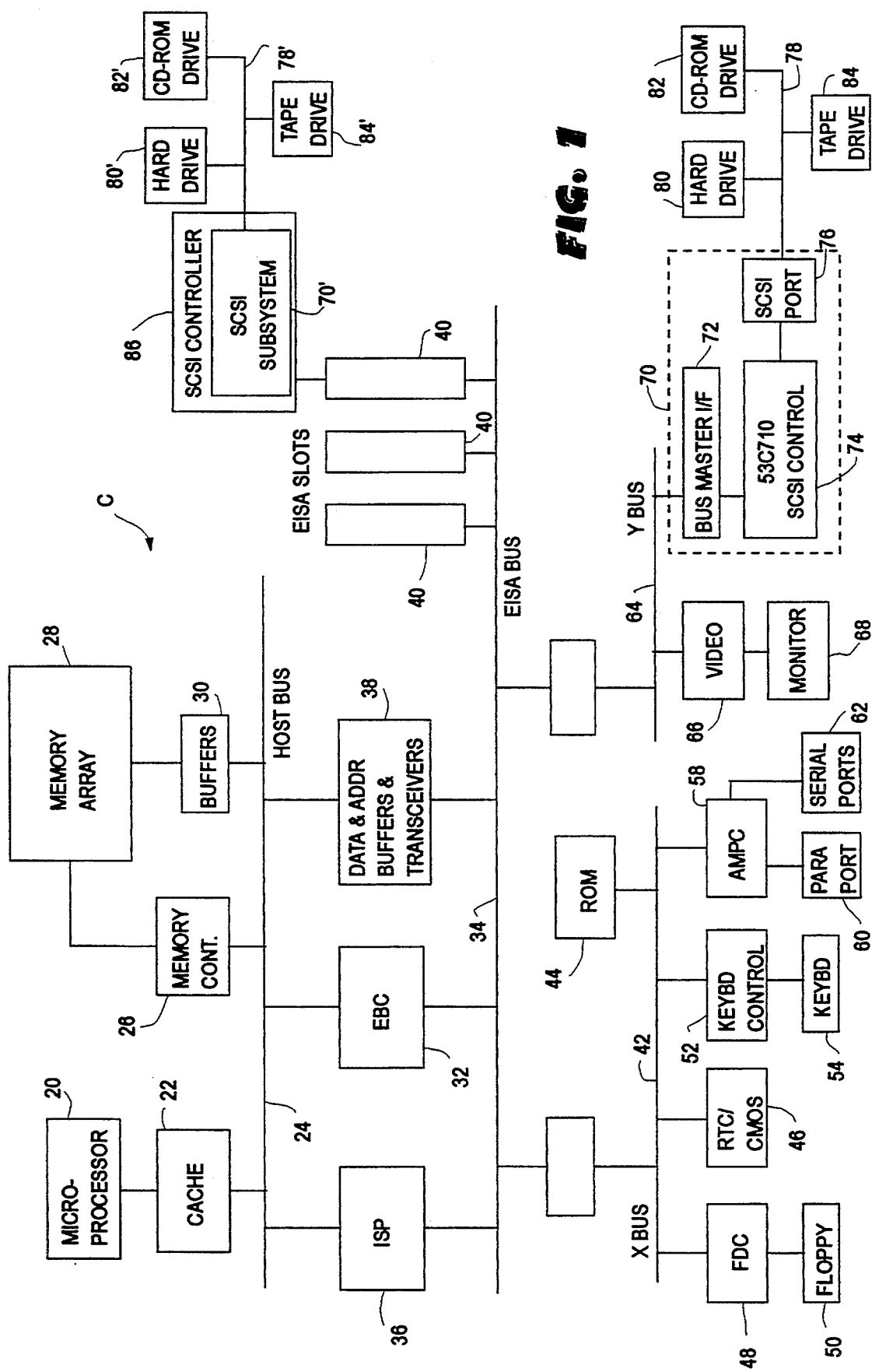
FIG. 1 is a block diagram of a computer system incorporating the present invention.

Referring now to FIG. 1, an exemplary computer system C operating according to the present invention is shown. A microprocessor 20, preferably an 80486 from Intel Corporation, is connected to a cache controller 22. The cache controller 22 in turn is connected to a host bus 24 which includes address, data and control portions. A memory controller 26 is connected to the host bus 24 to receive and control main memory operations. The memory controller 26 is connected to the main memory array 28 of the computer C, with the data from the main memory array 28 going through a data buffer 30 to the host bus 24.

Also connected to the host bus 24 is in an EISA bus controller (EBC) 32 which handles translation of signals between the host bus 24 and an EISA bus 34, the input/output bus preferably used. It is of course understood that other I/O buses could be utilized. The EBC 32 is connected to an integrated system peripheral (ISP) 36 which includes a DMA controller, timers, interrupt controller, EISA bus arbiter and other devices as necessary and common in an EISA system. The ISP 36 is connected to the host bus 24 and the EISA bus 34. In addition, the EBC 32 is connected to a series of address and data latches and transceivers 38 which are connected to the host bus 24 and EISA bus 34 and provide the necessary address and data latching and buffering to allow development of an EISA system. Also connected to the EISA bus 34 are a series of EISA slots 40 which receive interchangeable circuit boards.

Two additional buses are developed from the EISA bus 34. The first of these is referred to as the X bus 42 which is conventionally a 16-bit bus used to connect with the majority of support chips present on system board of the computer system C. For example, these support chips include a read only memory (ROM) 44; a real time clock (RTC) and CMOS memory 46; a floppy disk controller 48, which in turn is connected to a floppy disk drive 50; an 8042 keyboard controller 52, which is in turn connected to a keyboard 54 and a pointing device (not shown); and a multiple peripheral controller (AMPC) 58 which provides a parallel port 60 and a series of serial ports 62. These are devices which are conventional in a small computer system C such as the one shown and are provided to indicate a complete computer and are not necessarily related to the present invention.

A second bus developed from the EISA bus 34 is the Y bus 64, which is preferably a 32-bit bus to allow high data rate transfers to the EISA bus 34. A video controller 66 and its associated monitor 68 are connected to the Y bus 64. In addition, a SCSI subsystem 70 may be connected to the Y bus 64. The SCSI subsystem 70 includes a bus master interface 72, a 53C710 SCSI controller 74 and a SCSI port 76 which is used to connect to SCSI devices. In the case of the computer system C, the SCSI subsystem 70 is located on the system board as the computer system C preferably includes internal SCSI hard drives for performance reasons. A SCSI bus 78 is provided from the SCSI port 76 and has connected to it a SCSI hard drive 80, a SCSI CD-ROM drive 82 and a SCSI tape drive 84. Additional devices can be connected to the SCSI bus 78.

In an alternative, the SCSI subsystem 70 can be located on an interchangeable circuit board received in an EISA slot 40. In the illustrated embodiment a SCSI controller 86 is shown connected to an EISA slot 40. The controller 86 contains a SCSI subsystem 70', similar to the SCSI subsystem 70. An alternate SCSI bus 78' is provided, with alternate hard drive 80', CD-ROM drive 82' and tape drive 84'. While typically only one of either the SCSI subsystem 70 or the SCSI controller 86 will be present, if both are present, one is designated as a primary controller and any additional controllers are secondary controllers.

Figures 2, 3:
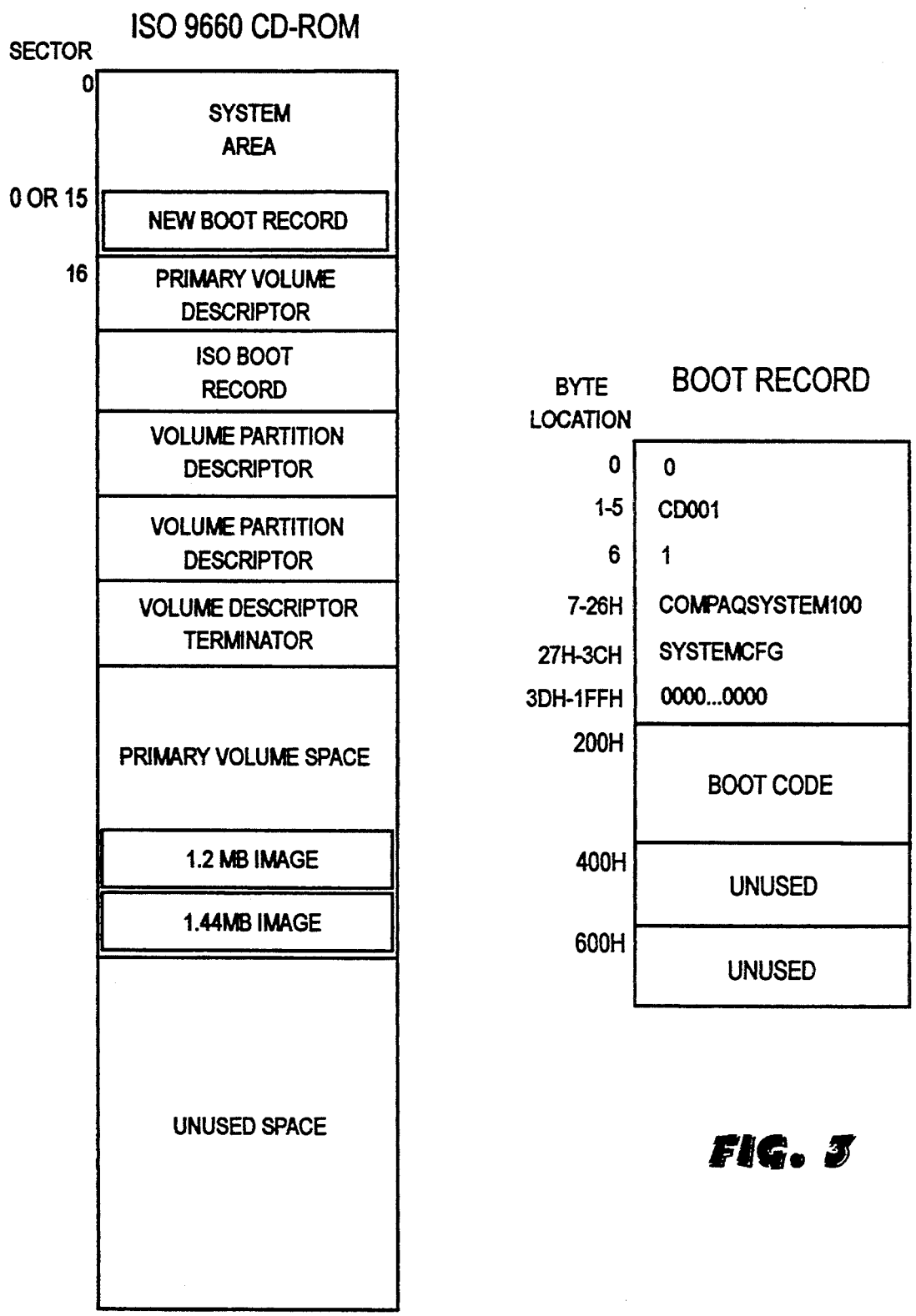
FIG. 2 is an illustration of the organization of a CD-ROM according to the present invention.
FIG. 3 is an illustration of a boot record according to the present invention.

FIG. 2 illustrates the arrangement of a CD-ROM according to the ISO 9660 standards, with additional boot images and boot record as utilized according to the present invention. As defined by the ISO, the first sixteen CD-ROM sectors, noting that those are 2 kbyte sectors, are designated as the system area. The system area is utilized as desired by the manufacturer for its own purposes. Therefore this is a non-standard area and can be developed as desired. It is particularly noted that conventional CD-ROM development systems allow the manufacturer the capability to provide information into this entire area. According to the ISO standard, at sector 16 a block called the primary volume descriptor block is located. The primary volume descriptor contains information about the CD-ROM and the data on it. Of particular importance in this description, a value in the primary volume descriptor indicates the size of the primary volume space contained on the particular CD-ROM, this being referred to as the volume size. In the illustrated embodiment the next sector is an ISO boot record, but it can be placed anywhere before the volume descriptor terminator. As noted in the background, there are no systems presently available which are capable of writing information to this location, and as such, the ISO boot record is merely specified and is not usable. The following next two sectors in the illustrated embodiment are volume partition descriptors. These areas are also not writable in the current environment. The sector after the descriptors is defined to be the volume descriptor terminator. This sector provides certain information which indicates that the various other blocks in the volume descriptor set used for providing information are terminating and that the primary volume space is to commence. Following the volume descriptor terminator, is the primary volume space, which is developed as necessary for the particular CD-ROM and according to conventions. This area is often quite large, on the order of 650 MB in a conventional CD-ROM. Again as noted in the background, systems are not available to write to certain of these particular areas and so, while defined they are illusory. The remaining portion of the CD-ROM is unused space.

According to the present invention a new boot record is placed in the system area at either sector 0 or 15, i.e. the first or last sector in the system area, the variation depending on other items located on the CD-ROM. The organization of this new boot record is provided in more detail in FIG. 3. The boot record is essentially as required or identified by the ISO standard but it is located at a different location which is accessible. The boot record commences with a 0 byte, followed by a designation CD001 to indicate that it is a CD and a value 1 to indicate an ISO 9660 standard CD-ROM conforming to version 1. The next 32 bytes are a boot system identifier provided by the manufacturer, with the boot identification provided as the next 37 bytes. The remaining portion of the first 512 bytes of the boot record is filled with zeros. The next 512 byte portion contains the boot code, which is described in detail below, and the final two 512 byte portions are unused.

It is also noted in FIG. 2 that a 1.2 MB floppy disk image and a 1.44 MB floppy disk image are provided inside and at the end of the primary volume space. Again, this is an area which can be readily written by conventional CD-ROM development system and thus does not require the use of nonstandard equipment.

A similar structure can be developed for a tape, so that tape can also be the boot media.

Figure 4:
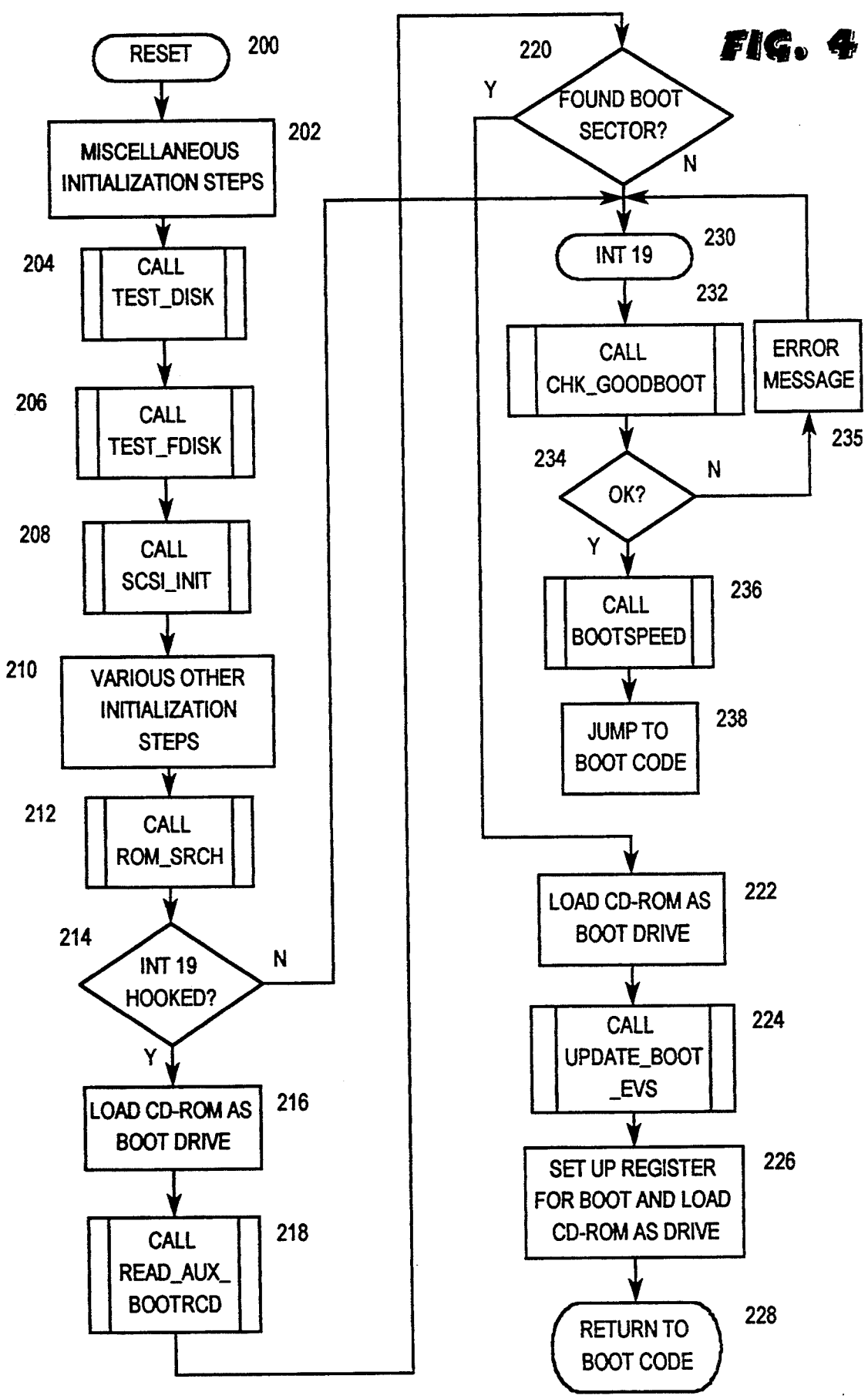
FIGS. 4, 5A, 5B, 6, 7A, 7B, 8, 9, 10, 11, 12, 13, 14, 15 and 16 are flowcharts of portions of the BIOS of a personal computer system according to the present invention.

Proceeding now to FIG. 4, the RESET sequence 200 commences at step 202, where miscellaneous initialization steps of the computer system are done. These initialization steps are well known to those skilled in the art and omitted for clarity. At step 204 the RESET sequence 200 calls a TEST_DISK sequence to determine if a floppy disk drive is installed in a system. Control then proceeds to step 206 to determine if a fixed or hard disk drive, other than a SCSI device, is present in the computer system by use of a TEST_FDISK sequence. Control then proceeds to step 208, where a subroutine referred to as SCSI_INIT is executed. This subroutine determines if computer system manufacturer developed SCSI controllers are present, such as the one on the system board or one in a slot, and if so, initializes up to two fixed disk drives on the primary controller and determines if a CD-ROM drive is connected to any controller, either primary or secondary, and initializes the first CD-ROM drive. Similarly, the SCSI_INIT routine also determines if a tape drive is present on the primary controller for use as a possible boot device. It is noted that while in the illustrated embodiment only the first CD-ROM or tape drive on the primary controller is designated for use as the boot device, the first CD-ROM on either the primary or secondary controllers could be utilized by simple changes to the SCSI_INIT sequence. After the SCSI systems are initialized and located, control proceeds to step 210 where the various remaining steps of initializing the computer are executed.

Figure 7A:
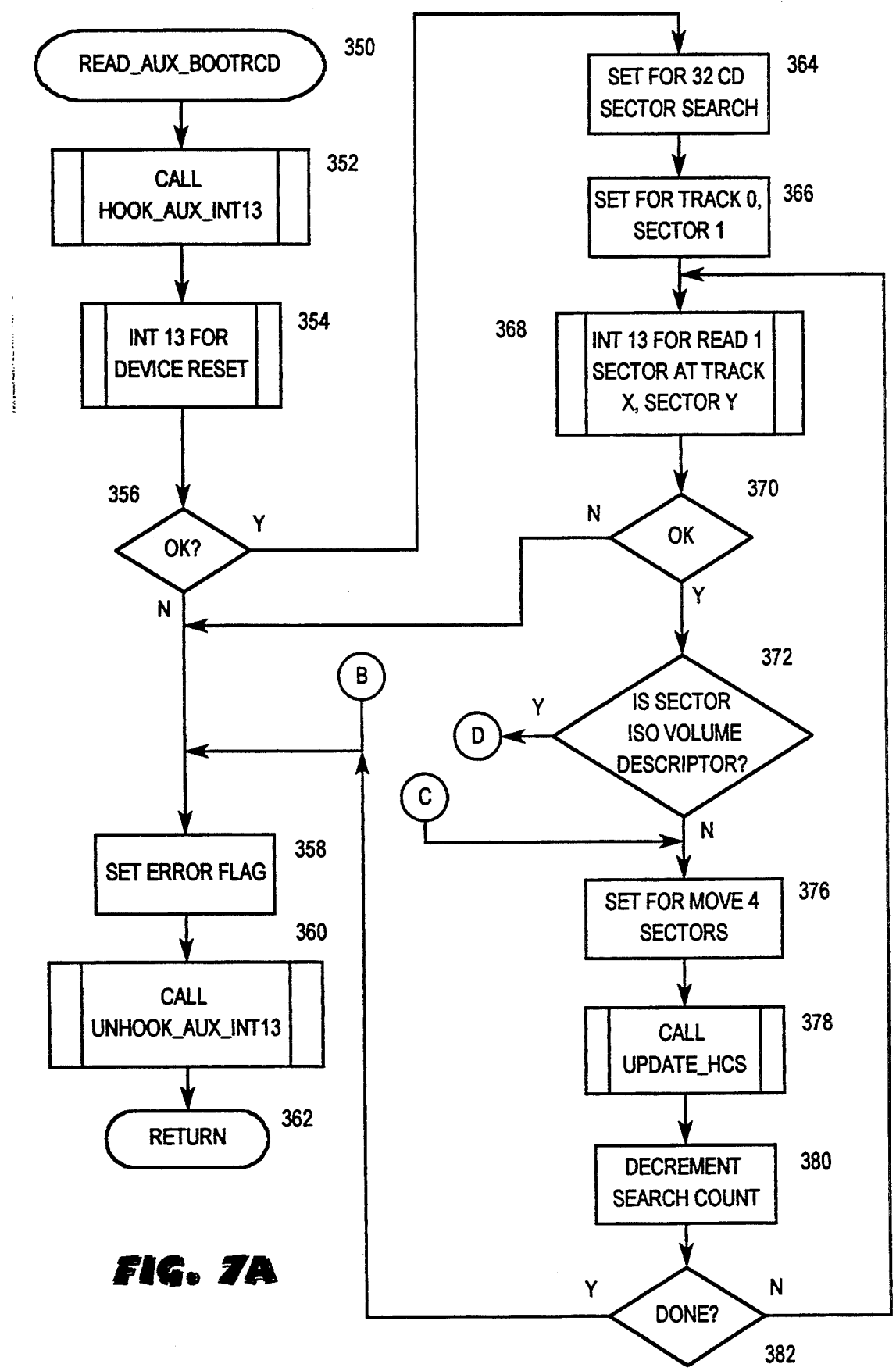
Figure 7B:
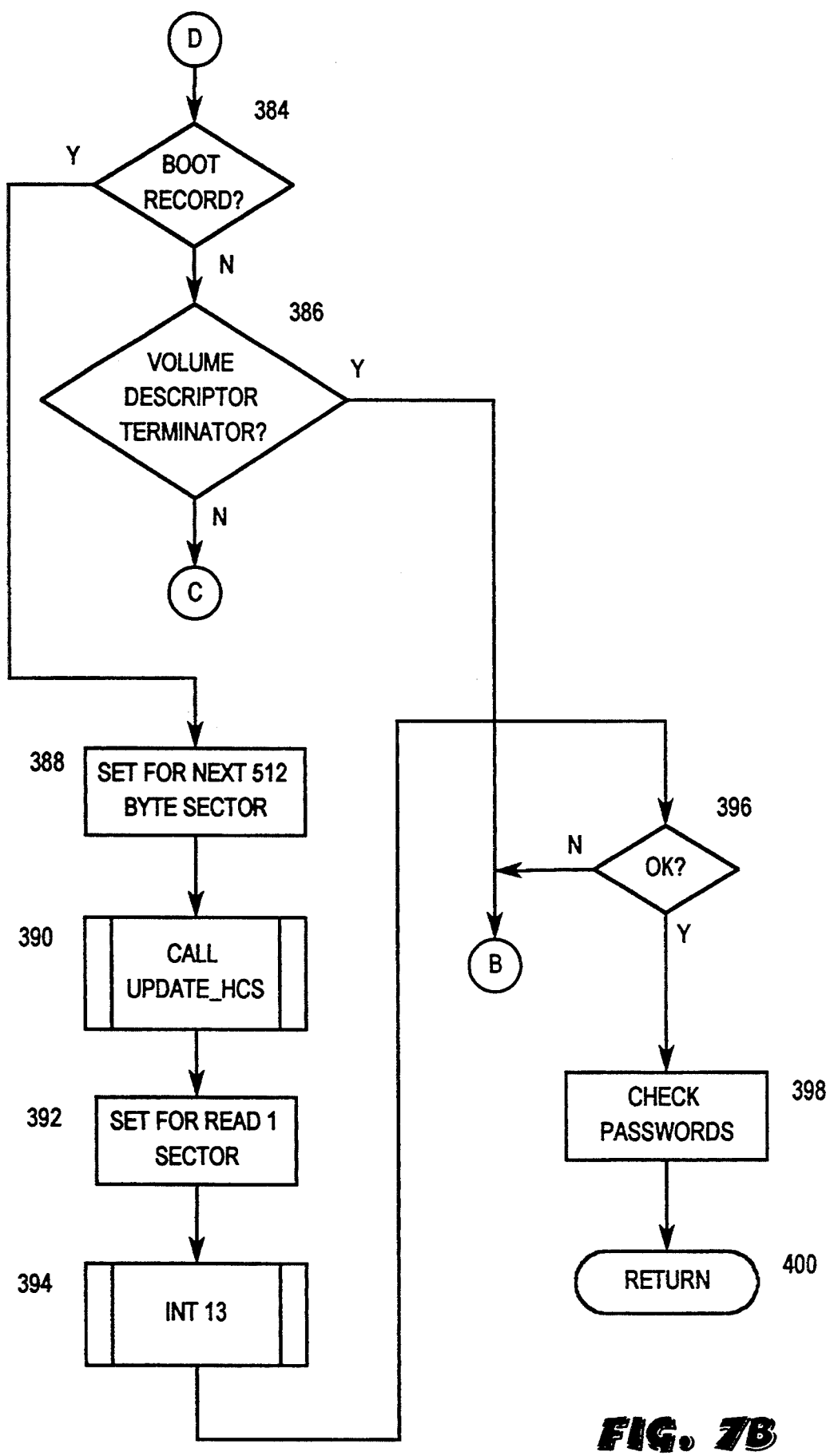

Control eventually proceeds to step 212, which is a call to a subroutine referred to as ROM_SRCH or ROM search. It is well known to those skilled in the art that option cards often include their own ROMs which contain code particular to that option card. The routine ROM_SRCH searches through the option ROM area to determine the location of such ROMs, and if one is found, the initialization code as provided by that ROM is executed. It is noted should an external or third party manufacturer's SCSI controller board be included in the computer system C and that SCSI hard drive is to be the boot device, then it is quite likely that INT 19, the interrupt designated for the boot function in IBM PC compatible computer systems, may be hooked or trapped by the code on the option card. The status of INT 19 is determined in step 214 to determine if it has been hooked. If so, it will be necessary to temporarily bypass the INT 19 code to boot from the CD-ROM drive. Control thus proceeds to step 216, where a value indicating that the CD-ROM drive is to be the boot device is loaded into a predetermined register. Control then proceeds to step 218 and calls a routine referred to as the READ_AUX_BOOTRCD sequence 350 (FIGS. 7A and 7B). The READ_AUX_BOOTRCD sequence 350 determines if a CD-ROM drive is present and if so, if it contains a boot sector as defined and illustrated in FIG. 3, loads the boot code to a particular location. The READ_AUX_BOOTRCD sequence 350 returns with an indication of whether a boot sector was found in the CD-ROM drive. This flag is evaluated in step 220. If a boot sector was found, control proceeds to step 222, where the CD-ROM drive is again indicated as the boot drive.

Figure 14:
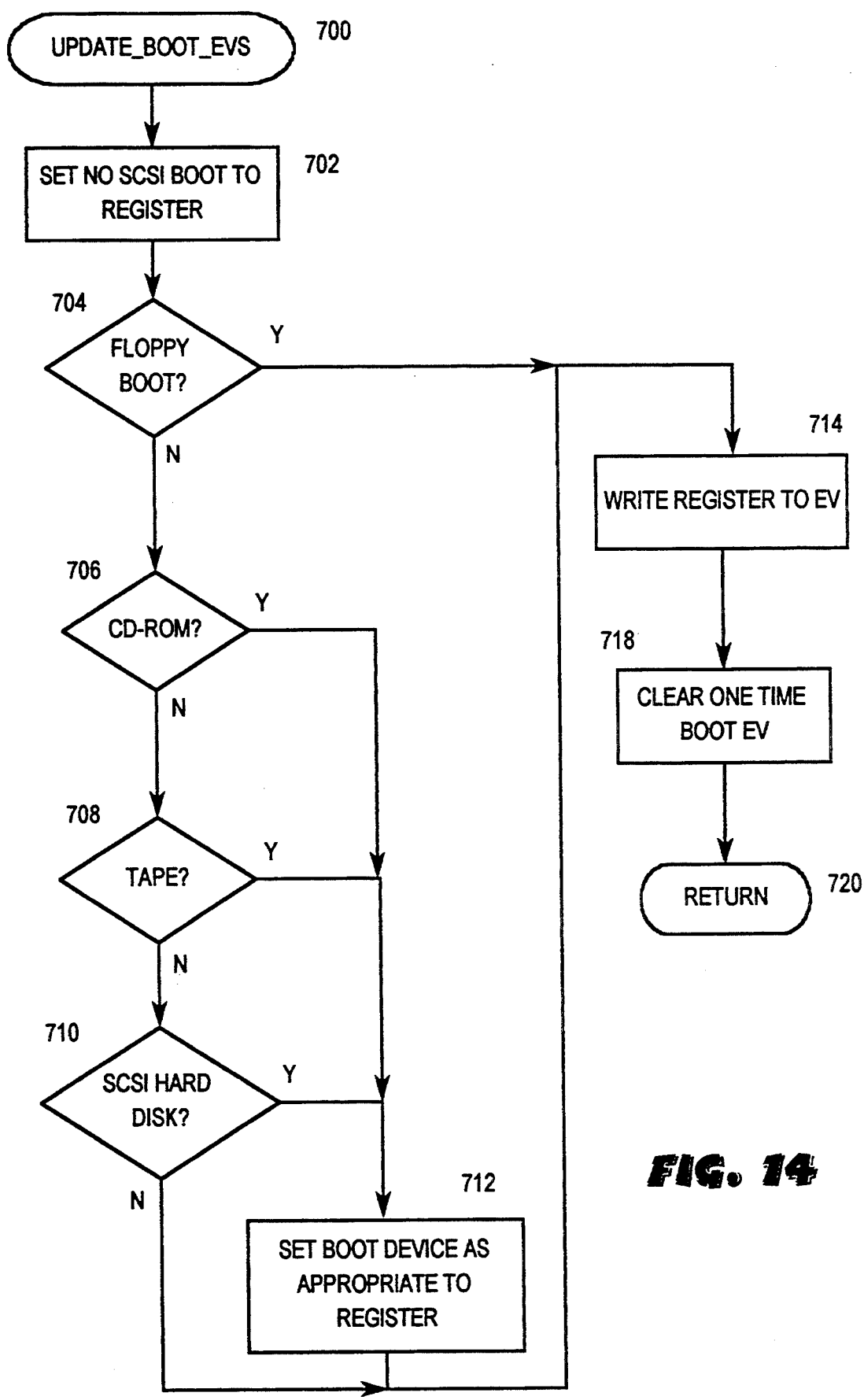

Control proceeds to step 224 where a sequence 700 called UPDATE_BOOT_EVS (FIG. 14) is called to change the order of any boot environment variables as necessary. Environment variables are contained in a non-volatile memory contained in the computer system C to allow configuration information and set up information to be stored even while the computer is off. Many of these areas are designated for internal operation of the computer system C and are referred to as environment variables. One of these indicates the boot order of the computer and another is used to indicate whether a special one time boot order is being utilized. For instance, if a one time boot order was requested, this should indicate that the CD-ROM or tape drive was to be used as the primary boot device ahead of the fixed disk drive or the floppy drive to allow the one time installation or use of the software utilizing the present invention. In other cases the normal order might be utilized. The one time and normal value ordering are written to this environment variable space by a configuration program not illustrated herein.

Control proceeds from step 224 to step 226, where the various microprocessor registers are set up for booting by execution of a return instruction and the CD-ROM drive is again indicated as being the boot drive. The computer system C then issues a return instruction to begin execution of the boot code.

If a boot sector was not found in step 220 or if INT 19 was not hooked in step 214, control proceeds to step 230, which is a call to the INT 19 sequence as located in the ROM 44. The first step of interest in INT 19 is step 232 where the CHK_GOODBOOT sequence 250 (FIGS. 5A and 5B) is called. The sequence is defined below. Control proceeds to step 232 to determine if good boot sector information had been obtained, i.e. a boot sector had been found. If not, control proceeds to step 235, which is an error message to indicate to the user that no system was found and booting cannot proceed. If a boot sector was found, control proceeds from step 234 to step 236 where the speed of the boot operation is set. Control then proceeds to step 238, which in this case is a simple jump instruction to the initial address where the boot code was loaded.

Figure 5A:
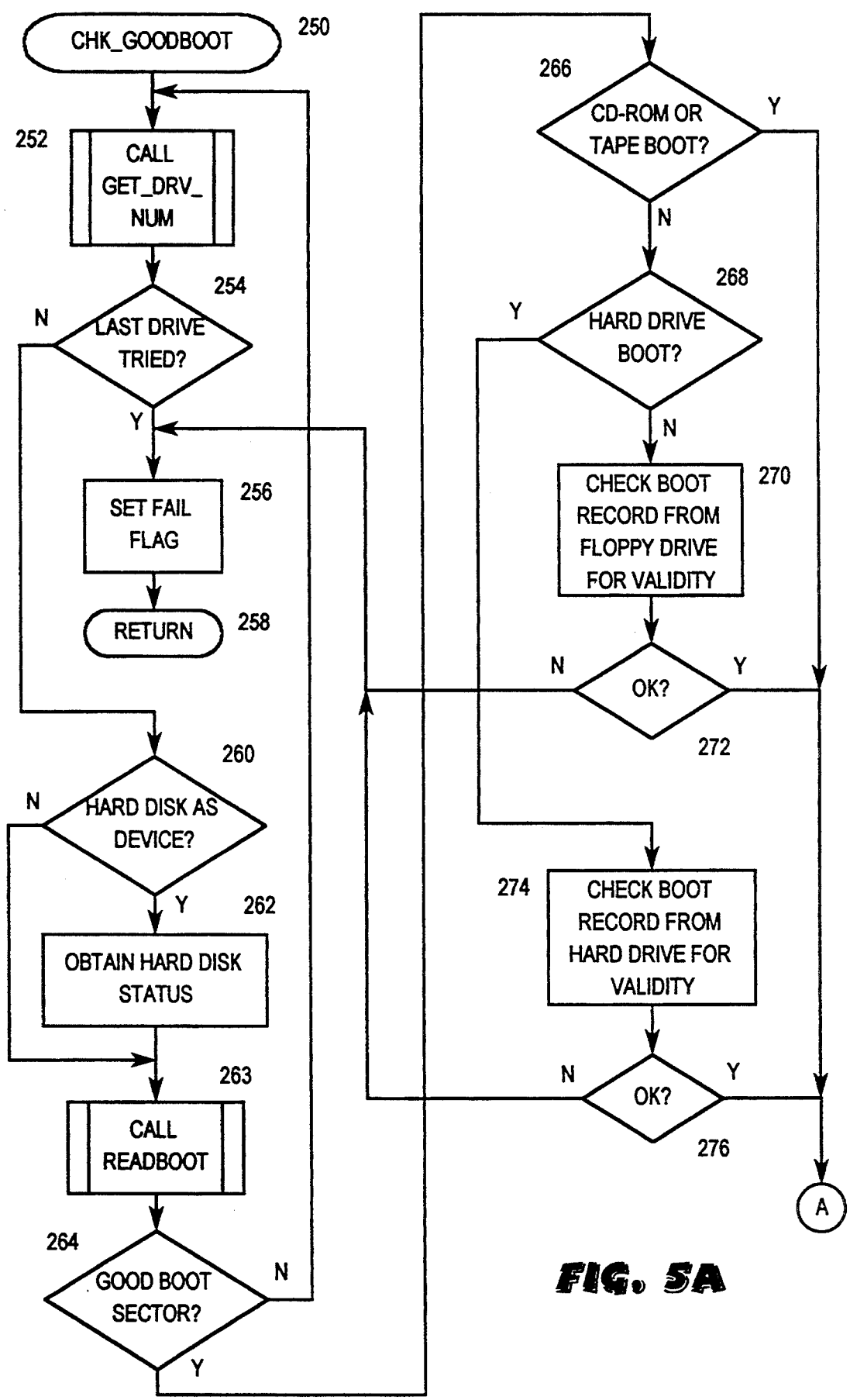
Figure 5B:
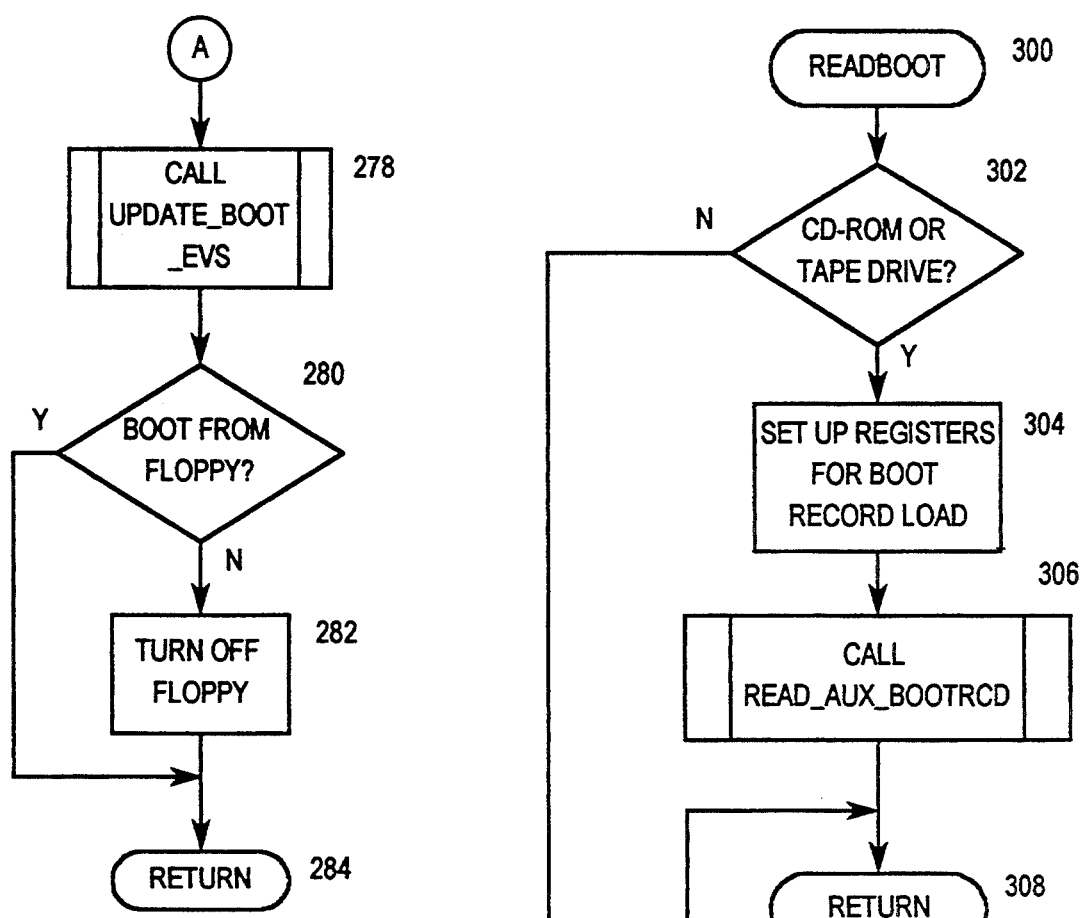
Figure 6:
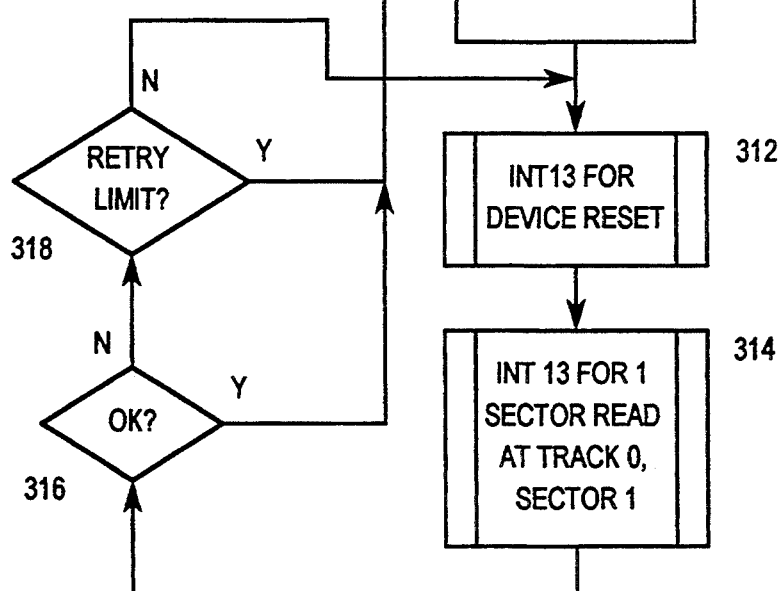

The CHK_GOODBOOT sequence 250 is illustrated in FIGS. 5A and 5B. Control starts at step 252 where a GET_DRV_NUM sequence 750 (FIG. 15) is executed. The GET_DRV_NUM sequence 750 is used to obtain the next desired device in the boot order. If this is the first pass, this call would obtain the first device. For each a repeated pass through, the next device is obtained, and if the end has been reached, a flag value is returned to indicate that the last drive has been tried. Control proceeds after step 252 to step 254 to determine if all drives have been tried. If so, a FAIL flag is set in step 256 and control returns to the calling sequence at step 258. If the last drive was not tried, control proceeds to step 260 to determine if the hard disk drive is indicated as the boot device. If so, control proceeds to step 262 where the hard disk status is determined. From step 260 if the hard disk is not the indicated device or after step 262 control proceeds to the READBOOT sequence 300 (FIG. 6). The READBOOT sequence 300 actually reads the boot record from the indicated device to a predefined location in memory. After the READBOOT sequence 300 has executed, in step 264 a determination is made whether a good boot sector has been obtained as indicated by the READBOOT sequence 300. If not, control proceeds to step 252 and the sequence is repeated until either the final device is tried and there is a failure or a boot sector is obtained.

If a good boot sector has been obtained as determined in step 264, control proceeds from step 264 to step 266 to determine if the device being used is a CD-ROM or tape drive. If not, control proceeds to step 268 to determine if the hard drive is indicated as the boot device. If not, the boot record is obtained from the floppy drive in step 270 and checked for validity and control then proceeds to step 272 to determine if the boot record is valid. If not, control returns to step 256. If the hard drive was the boot device, control proceeds to step 274 where the boot record is checked for validity. A step 276 is used to determine if it is valid. If not, control returns to step 256. If the CD-ROM or tape devices were the boot device as indicated in step 256 or boot records were successfully obtained as determined in steps 274 or 276, control proceeds to step 278 where the UPDATE_BOOT_EVS sequence 700 is executed. Control then proceeds to step 280 to determine if the floppy drive is the boot device. If not, control proceeds to step 282 where the floppy drive motor is turned off. If the booting was not from the floppy drive as determined in step 280 or after step 282, control proceeds to step 284, which is a return to the calling sequence.

The READBOOT sequence 300 is illustrated in FIG. 6. The READBOOT sequence 300 commences at step 302 to determine if the CD-ROM or tape drive is being indicated as the boot device. If so, control proceeds to step 304 where registers are set up for a boot record load from these particular devices. Control then proceeds to step 306 which is a call to the READ_AUX__BOOTRCD sequence 350. After that, control proceeds to step 308 which is a return from the sequence as the READ_AUX_BOOT record sequence 350 will have retrieved the boot record. If it is not a CD-ROM or tape drive as indicated in step 302, control proceeds to step 310 to set a three retry limit. Control then proceeds to step 312, where INT 13 is called to reset the particular boot device. INT 13 is a defined handler for floppy and hard disk operations and is called in a normal fashion with the proper values as conventional for a reset. Control then proceeds from step 312 to step 314 where a request is made via INT 13 to read one sector at track 0, sector 1. This has previously been defined as the boot record sector for hard disks and floppy disks. Control proceeds from step 314 to step 316 to determine if the boot record had been properly obtained. If so, control proceeds to step 308. If not, control proceeds to step 318 to determine if the retry limit had been reached. It is noted that in this case the INT 13 sequence will have incremented the retry value. Therefore, if the retry limit has been reached, control proceeds to step 308 to effectively indicate an error condition. If it has not, control proceeds to step 312.

Figure 8:
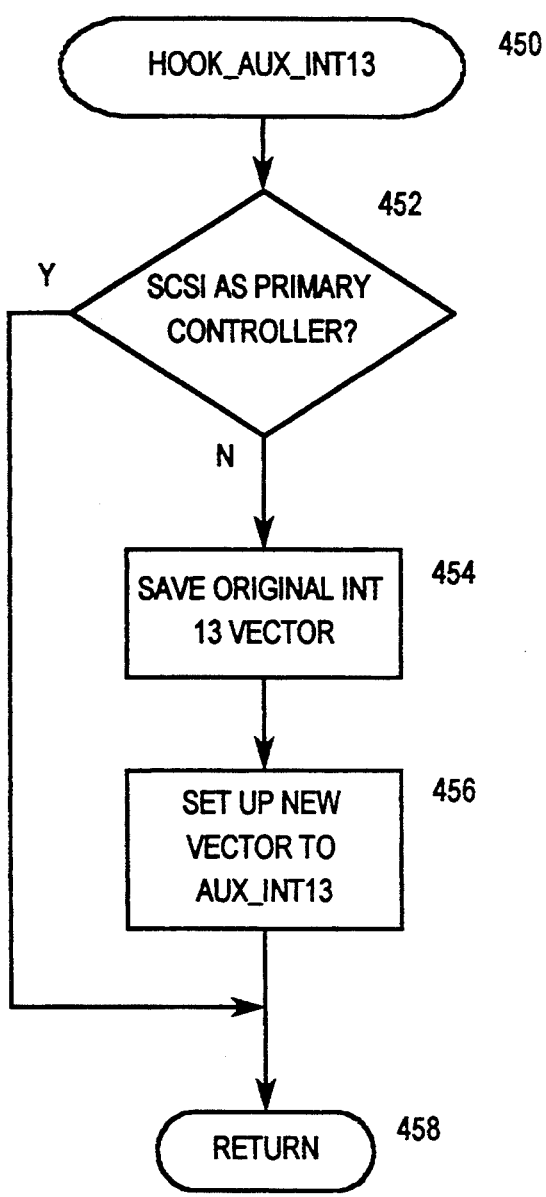

The READ_AUX_BOOTRCD sequence 350 (FIG. 7A, 7B) commences at step 352 where the sequence HOOK_AUX_INT13 sequence 450 (FIG. 8) is called. The HOOK_AUX_INT13 sequence 450 is utilized to provide an auxiliary or alternate INT 13 sequence provided for the cases where the CD-ROM or tape drives have been designated and used as the boot device. Control then proceeds to step 354 where INT 13 is called to reset the particular device. Control proceeds to step 356 to determine if the reset properly occurred. If not, control proceeds to step 358, where an error flag is set and then to step 360 where the UNHOOK_AUX_INT13 sequence 470 (FIG. 9) is executed to remove the AUX_INT13 sequence 500 from the INT 13 chain. Control then proceeds to step 362, which is a return from the sequence.

If the device was properly reset as determined in step 356, control proceeds to step 364 where a value is set to indicate that 32 CD sectors are to be searched. Control then proceeds to step 366, where values are set to indicate a request for track 0, sector 1. It is noted that these are 512 byte sectors as conventionally used in a floppy or hard disks and that a conversion is done by the actual SCSI driver code to convert from 512 byte sectors to the 2 kbyte sectors conventionally utilized with the CD-ROM or to the appropriate size used by the tape drive. Control then proceeds to step 368, which is an INT 13 call to read one sector at the track and sector as indicated. Control then proceeds to step 370 to determine if the one sector was read satisfactorily. If it was not completed correctly, control proceeds to step 358. If it was completed, control proceeds to step 372 to determine if the obtained sector is an ISO volume descriptor. This test determines if the sector contains a boot record, an ISO volume descriptor or volume descriptor terminator, based on certain common values present in each structure. If not, control proceeds to step 376 where a value of 4 is indicated to increase the next read request to the proper sector number for the next CD-ROM sector to be searched. Control proceeds to step 378 where a sequence referred to as UPDATE_HCS is used to update the indicated sector number into a proper head, cylinder and sector number as defined according to the equivalent size and number of heads, cylinders and sectors on the particular device. Control then proceeds to step 380, where the sector search count is decremented. In step 382 a determination is made if all 32 sectors have been searched. If so, this is an indication that the CD-ROM being read does not contain a boot record and control proceeds to step 358. If it was not done, control returns to step 368 and it is repeated. Thus it is noted that this sequence scans the first 32 sectors of the CD-ROM, beginning at sector 0, looking for a boot record. In this fashion if a boot record is located inside the system area, or if an ISO standard boot record is present, either one will be found.

If the sector is an ISO volume descriptor as indicated in step 372, control proceeds to step 384 to determine if the particular sector read is a boot record. This is indicated by the organization and description of the information at the beginning of the boot record. If not, control proceeds to step 386 to determine if the sector is a volume descriptor terminator. If so, this is a second indication that no boot record is contained on the CD-ROM, as the search has gone this far and no boot record has been found, as the boot volume descriptor terminator is an indication that the next sector is the primary volume space and thus no boot record is present. If it is a volume descriptor terminator control proceeds to step 358. If it is not a volume descriptor terminator, it was another type of descriptor and control returns to step 376 to search the next sector.

If a boot record is found, control proceeds to step 388 where the sector value is incremented by one to request the next floppy disk sector. Control proceeds to step 390, where the UPDATE_HCS sequence is called to update the head, cylinder and sector numbering and then control proceeds to step 392, which sets the proper values to read one sector. Then control proceeds to step 394, where INT 13 is executed and effectively the second floppy disk sector of the boot record is obtained. This particular sector contains the information which is the actual boot code used to find and locate the floppy image and to load the boot record from the floppy image into memory, which is then executed. These operations are described below. After the INT 13 is completed, a check is made in step 396 to determine if it was successfully performed. If not, control proceeds to step 358. If so, control proceeds to step 398, where various passwords in the computer system C are checked to determine if booting is proper. Control then returns at step 400.

The HOOK_AUX_INT13 sequence 450 commences at step 452 to determine if a SCSI controller is being utilized as the primary controller. Control proceeds to step 454 if the SCSI controller is not the primary controller. In step 454 the original INT 13 vector is saved in a temporary location so that it can be returned later or utilized if necessary. Control then proceeds to step 456, where a new vector which points to the AUX_INT13 sequence 500 is loaded in the INT 13 vector location of the microprocessor 20. If the SCSI controller is the primary controller or after step 456, control proceeds to step 458 which is a return from the calling sequence. Hooking is not necessary if the SCSI controller is the primary controller as the initialization code will have already executed similar code to hook INT 13.

Figure 9:
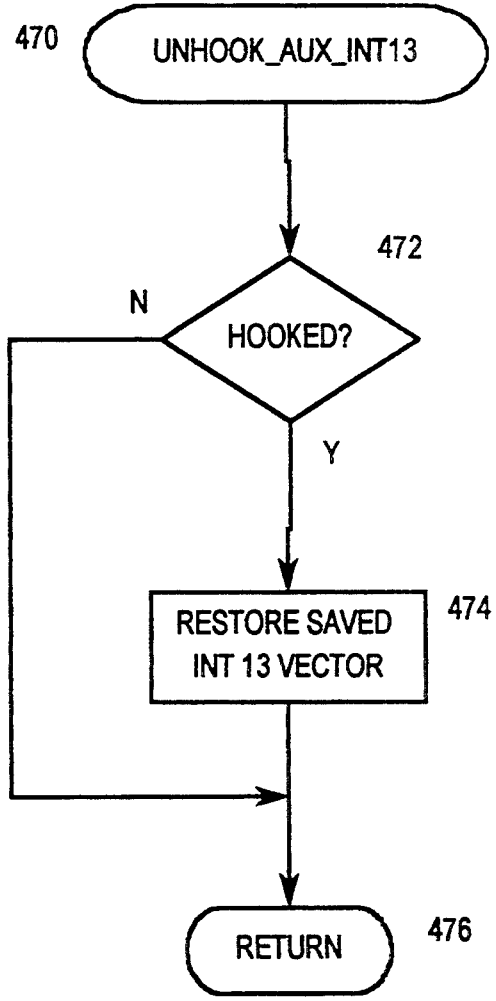

The UNHOOK_AUX_INT sequence 470 is shown in FIG. 9. As a first step 472, a determination is made whether INT 13 is actually hooked and directed to the AUX_INT13 sequence 500. If so, the saved INT 13 vector is restored in step 474. If not hooked or after step 474, control proceeds to step 476, which is a return from the sequence.

Figure 10:
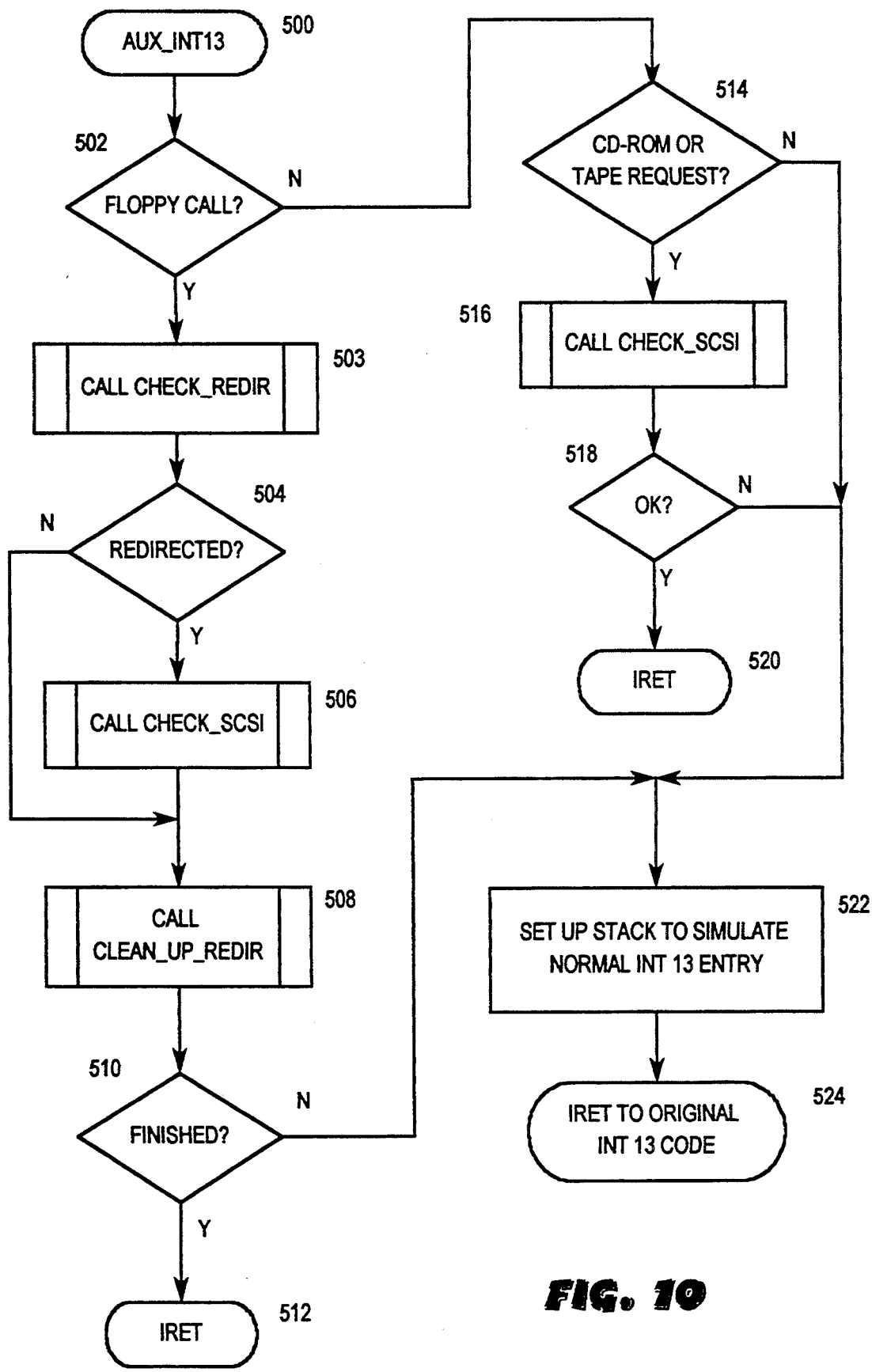
Figure 12:
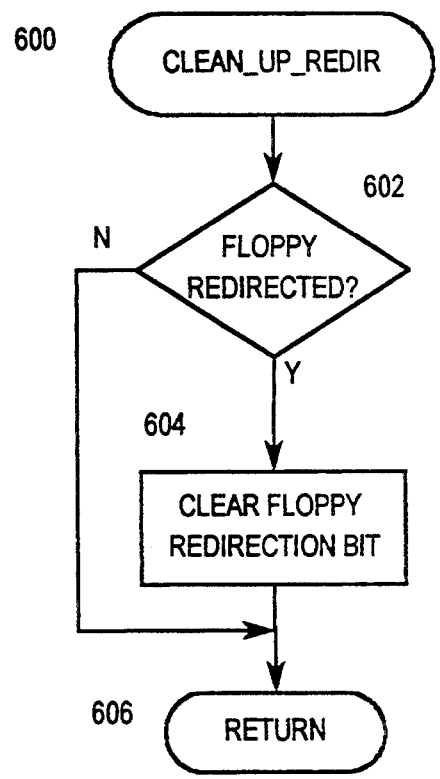
Figure 13:
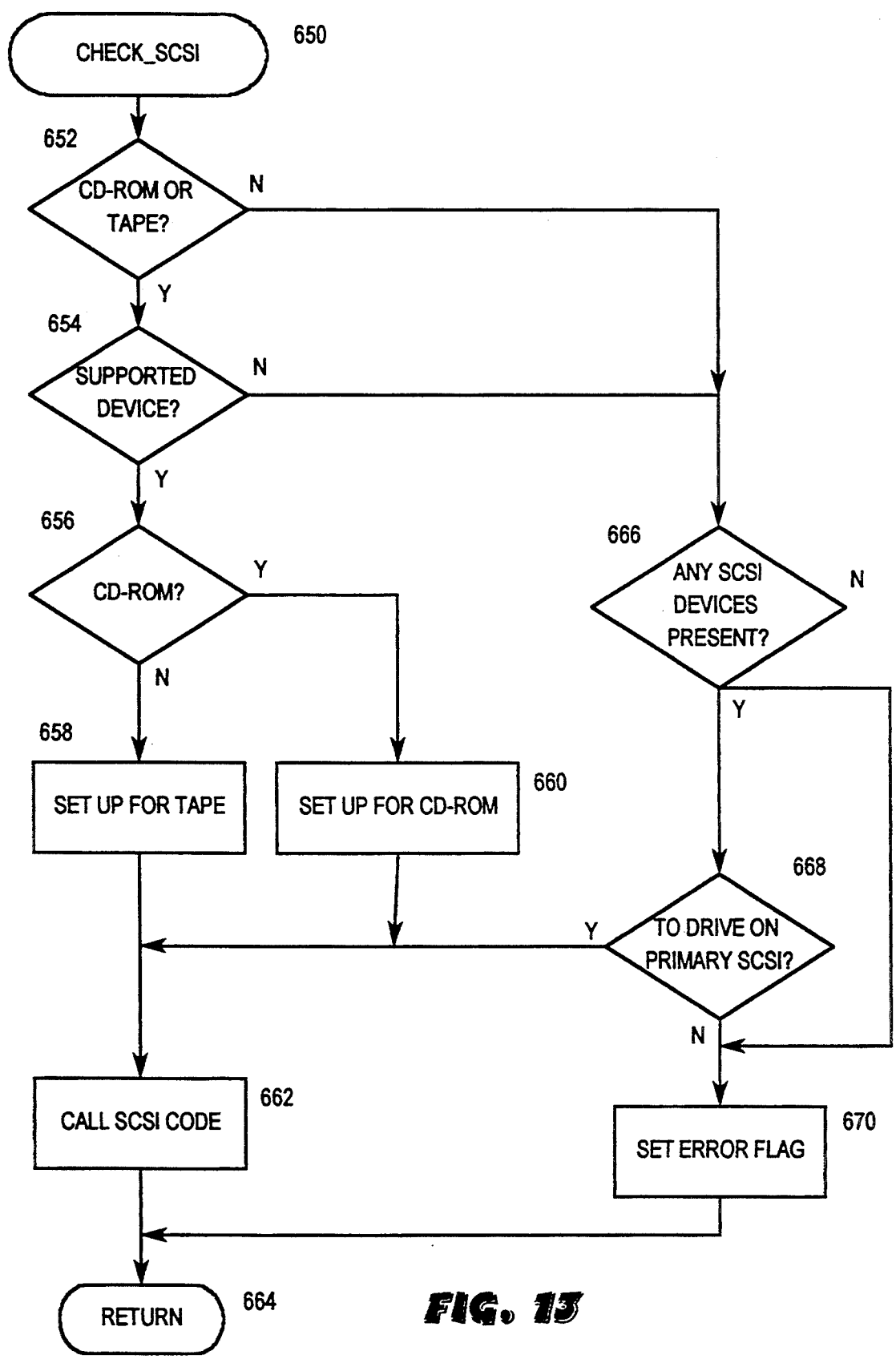

The AUX_INT13 sequence 500 is illustrated in FIG. 10. Control proceeds to step 502 to determine if the call to the INT 13 is for a floppy drive operation. If so, control proceeds to step 503 where the CHECK_REDIR sequence 550 is executed. Control then proceeds to step 504 to determine if floppy drive operations are being redirected. Redirection is indicated by the use of two different variables, one of which indicates the actual location of the floppy drive boot image and the second of which indicates that floppy drive redirection is in effect. If the floppy drive boot image value is non-zero, then redirection is in effect. Additionally, if a floppy drive redirection bit is set, redirection is also in effect. Two different indicators are used for convenience but only one could be used if desired. Both of the redirection flags or values are stored in what is referred to as the extended BIOS primary volume space or EBDA as conventional in IBM PC compatible computers. If it is redirected, control proceeds to step 506, where a CHECK_SCSI sequence 650 (FIG. 13) is called. After the CHECK_SCSI sequence 650 is called to obtain the selected sector or sectors from the indicated device, control proceeds to step 508, which is where control proceeds if no redirection is in effect. Step 508 is a call to the CLEAN_UP_REDIR sequence 600 (FIG. 12) which cleans up any redirection variables if no redirection is occurring. Control proceeds to step 510 to determine if the floppy drive operation is finished. If so, an interrupt return is executed at step 512.

If a floppy drive call was not being requested in step 502, control proceeds to step 514 to determine if the request is to the CD-ROM or tape device. If so, in step 516 the CHECK_SCSI sequence 650 is called. Control proceeds to step 518 to determine if the sector or sectors was properly obtained. If so, control proceeds to step 520 which is an interrupt return. If it was not a CD-ROM or tape request in step 514, or the sector was not properly obtained in step 518, or if the floppy drive operations were not finished in step 510, control proceeds to step 522, where the stack of the computer is set up to simulate an entry by a normal INT 13 call. This is done by providing the additional values necessary which will then be popped from the stack and returned into the various registers when an interrupt return instruction is executed. In this manner the sequence will simulate a conventional entry into the INT 13 sequence when an interrupt return is executed. Control then proceeds to step 524, where the interrupt return is executed, so that control effectively returns to the INT 13 code as though normal operations were occurring.

Figure 11:
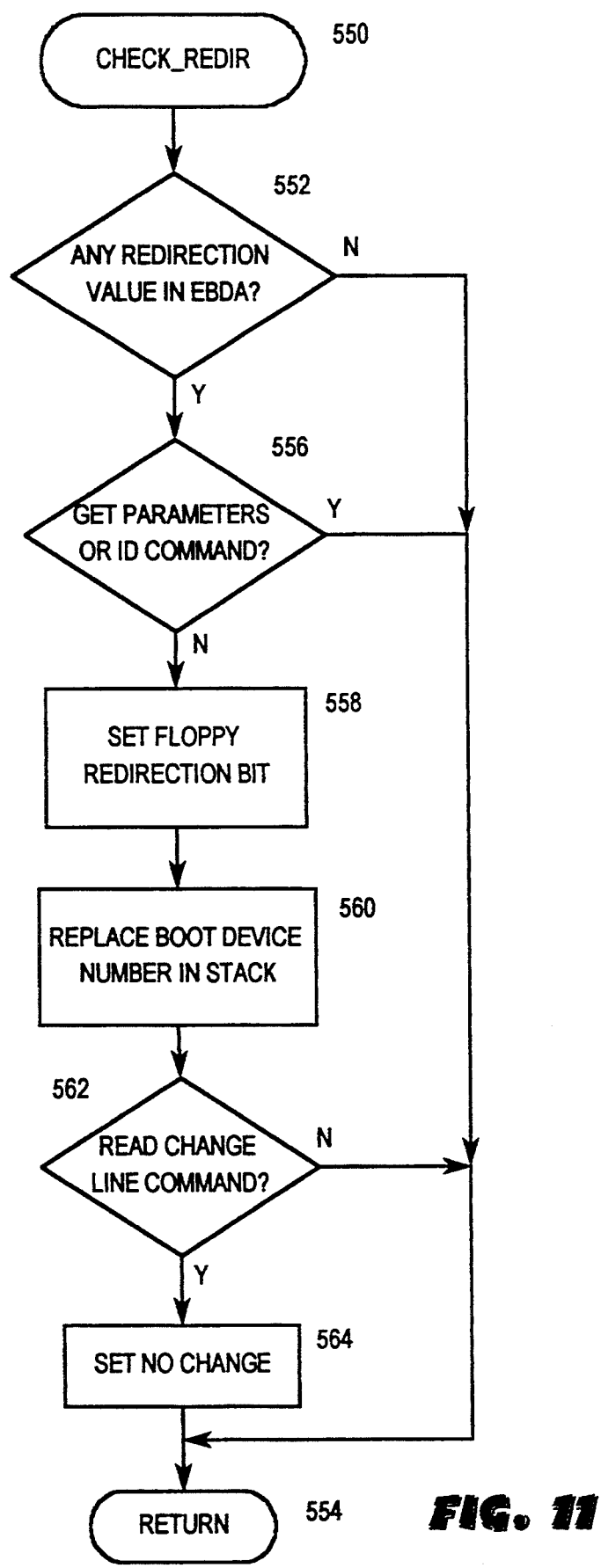

The CHECK_REDIR sequence 550 (FIG. 11) commences operation at step 552 to determine if there is a redirection value located in the EBDA. This is a check to determine the sector location of the floppy drive image. If the value is 0, then redirection is not occurring and control proceeds directly to step 554, which is a return. If there is a value, this is an indication that redirection is occurring and control proceeds to step 556 to determine if the particular command being requested is one to get drive parameters or to identify the drive. In this case it is appropriate to pass this request on directly to the actual INT 13 sequence, which directs the request to the floppy drive itself. Because in this case the boot is being done from a simulated floppy drive, it is appropriate to pass these calls. Thus, if it is a parameter or ID command, control proceeds to step 554. If not, control proceeds to step 558, where the floppy redirection bit contained in the EBDA is set. Control proceeds to step 560, where the boot device number contained in the stack is replaced with that appropriate for the redirected device. As indicated above, this sequence is entered via an INT 13 requested. As such, the various register values, including the register value which indicates the selected device, will have been pushed onto the stack by the microprocessor 20 when it performs the interrupt. Step 560 knows the location of that particular entry in the stack and replaces the indicated boot device with the value of the CD-ROM or tape drive as appropriate. Control then proceeds to step 562 to determine if the read change line command was received. This will be an indication that the floppy disk contained in the floppy drive had actually been changed. If it is not the command, control proceeds to step 554. If it is the command, in step 564 it is indicated that no change has occurred and then control proceeds to step 554.

The CLEAN_UP_REDIR sequence 600 (FIG. 12) commences at step 602, where the floppy redirection bit in the EBDA is tested. If the floppy is being redirected, control proceeds to step 604 where the particular floppy redirection bit is cleared. Control then proceeds to step 606 which is a return. If no redirection is occurring, control proceeds directly from step 602 to step 606.

The CHECK_SCSI sequence 650 commences at step 652 by determining if the CD-ROM or tape drive is the requested device. If so, control proceeds to step 654 to determine if the particular device being requested is a supported device. This is appropriate because numerous SCSI controllers operate differently and as this routine is preferably contained in the ROM of the computer C, only a limited number of controllers will customarily be supported. If the device is supported, control proceeds to step 656 to determine if the CD-ROM is the requested device. If not, control proceeds to step 658, where the proper SCSI command request is set up for the tape drive. If it is a CD-ROM, control proceeds to step 660 where a SCSI command request is set up to indicate operations for the CD-ROM. From step 658 or step 660, control proceeds to step 662, where the actual SCSI driver code is executed. It is noted that one portion of this SCSI code determines if redirection is occurring and if so, adds the value indicated in the redirection value in the EBDA, so that the requested sector of the floppy drive image is actually translated to the proper device on the CD-ROM or tape. Control then proceeds to step 664 after the SCSI code has completed operation.

If it was not a CD-ROM or tape request or a supported device, control proceeds from step 652 and 654 to step 666 to determine if any SCSI devices are present. If so, control proceeds to step 668 to determine if one of the first two drives on the primary SCSI controller are being requested. If so this is appropriate for a SCSI hard disk boot and control proceeds to step 662. If no devices are present in step 666 or it is not the first drive as indicated in step 668, control proceeds to step 670 where an error flag is set and then control proceeds to step 664.

The UPDATE_BOOT_EVS sequence 700 commences at step 702, where a value in a register is set to indicate that no SCSI boot has occurred. Control proceeds to step 704 to determine if a floppy boot has been requested. If not, control proceeds to step 706 to determine if a CD-ROM boot was requested. If not, control proceeds to step 708 to determine if a tape drive boot was requested. If not, control proceeds to step 710 to determine if a SCSI hard disk boot request has occurred. If a CD-ROM, tape or SCSI hard disk boot request has occurred, control proceeds from steps 706, 708 and 710 to step 712, where the particular boot device is set as appropriate in a register. If none of those devices were set, a floppy drive boot was requested in step 704 or after the boot device is set in step 712, control proceeds to step 714, where the register value is written to an environment variable for later use. Control then proceeds to step 718 where the one time boot environment variable is cleared and control then proceeds to step 720.

Figure 15:
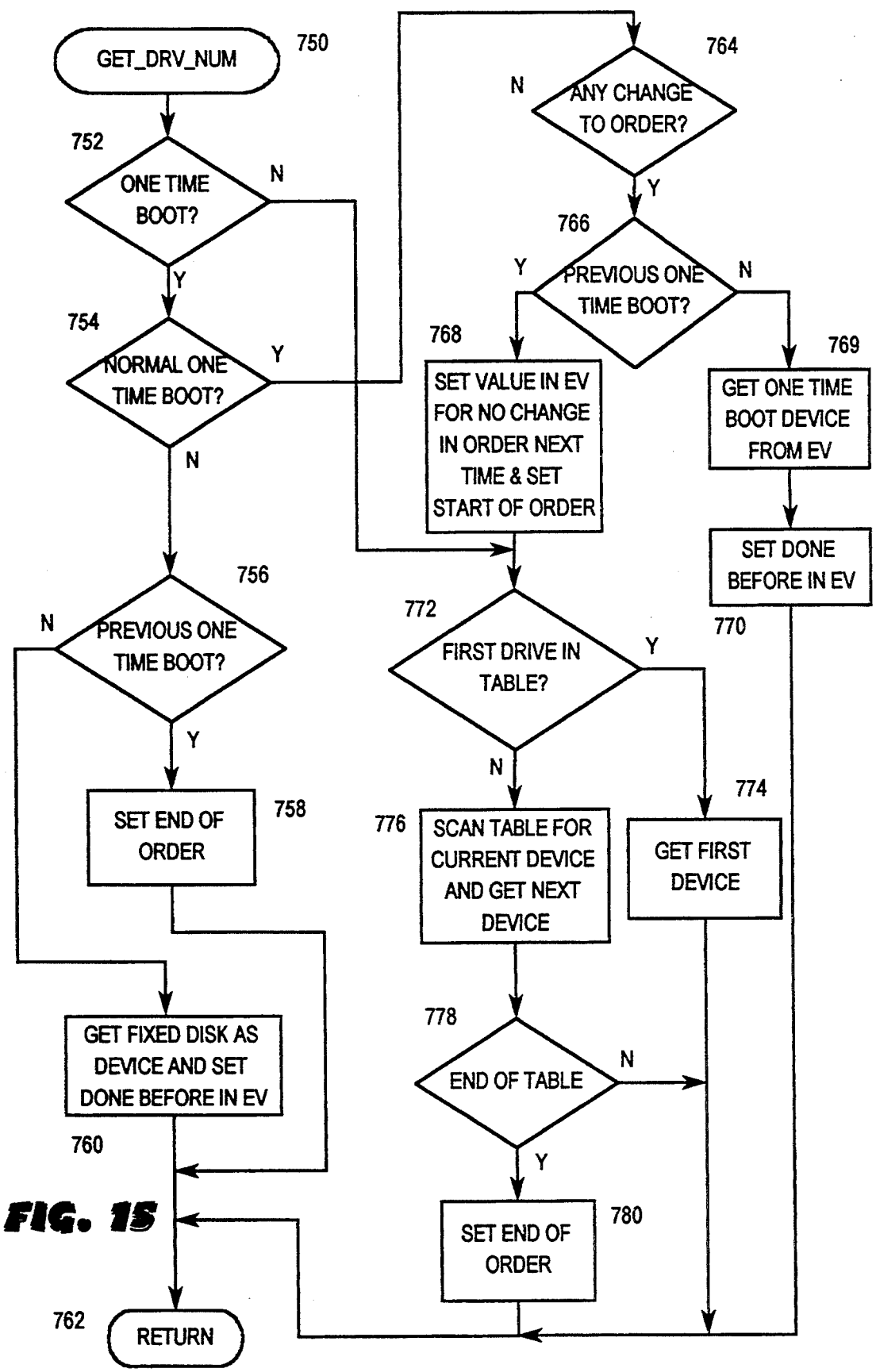

The GET_DRV_NUM sequence 750 is illustrated in FIG. 15. It commences operation in step 752 to determine if a one time boot is occurring. If so, control proceeds to step 754 to determine if it is a normal one time boot. If not, control proceeds to step 756 to determine if a one time boot operation has previously occurred, such as in the prior operation. If so, this is an indication that the one time boot is completed, so that an end of order or done value is set in step 758. If there has been no previous one time boot, control proceeds to step 760, where the fixed disk is obtained as the device and a value referred to as DONE BEFORE is set in the one time boot environment variable. Control proceeds from steps 758 and 760 to step 762, which is a return from sequence. Thus this path provides for a one time boot from the hard disk only.

If it was a normal one time boot, as determined in step 754, control proceeds to step 764 to determine if there was any change to the boot order. If so, control proceeds to step 766 to determine if there had previously been a one time boot. If so, control proceeds to step 768, where the value in the environment variable is set to indicate no change in the boot order and the start of order value is set to indicate that the first device in the normal order is to be tried. Control then proceeds to step 772.

If it has not been done before in step 766, control proceeds to step 769, where the one time boot device is obtained from the environment variable and control proceeds to step 770, where the DONE BEFORE variable is set in the environment variable so that the next pass through will indicate a completion. Control then proceeds from step 770 to step 762. In step 772 a determination is made whether the first drive indicated in the drive order table is being requested. If so, control proceeds to step 774 and the first device is obtained. Control then proceeds to step 762. If it was not the first device in the order table, control proceeds to step 776 where the table is scanned to determine the current device and the next device is then obtained based on the particular table order. Control proceeds to step 778 to determine if the next device was actually past the end of the table. If so, this is an indication that the booting operation has completed in a failed manner, so in step 780 the end of order value is set to indicate a failed return. If it was not the end of the table, control proceeds from step 778 to step 762 to return with the actual device number to be tried next in the register.

Figure 16:
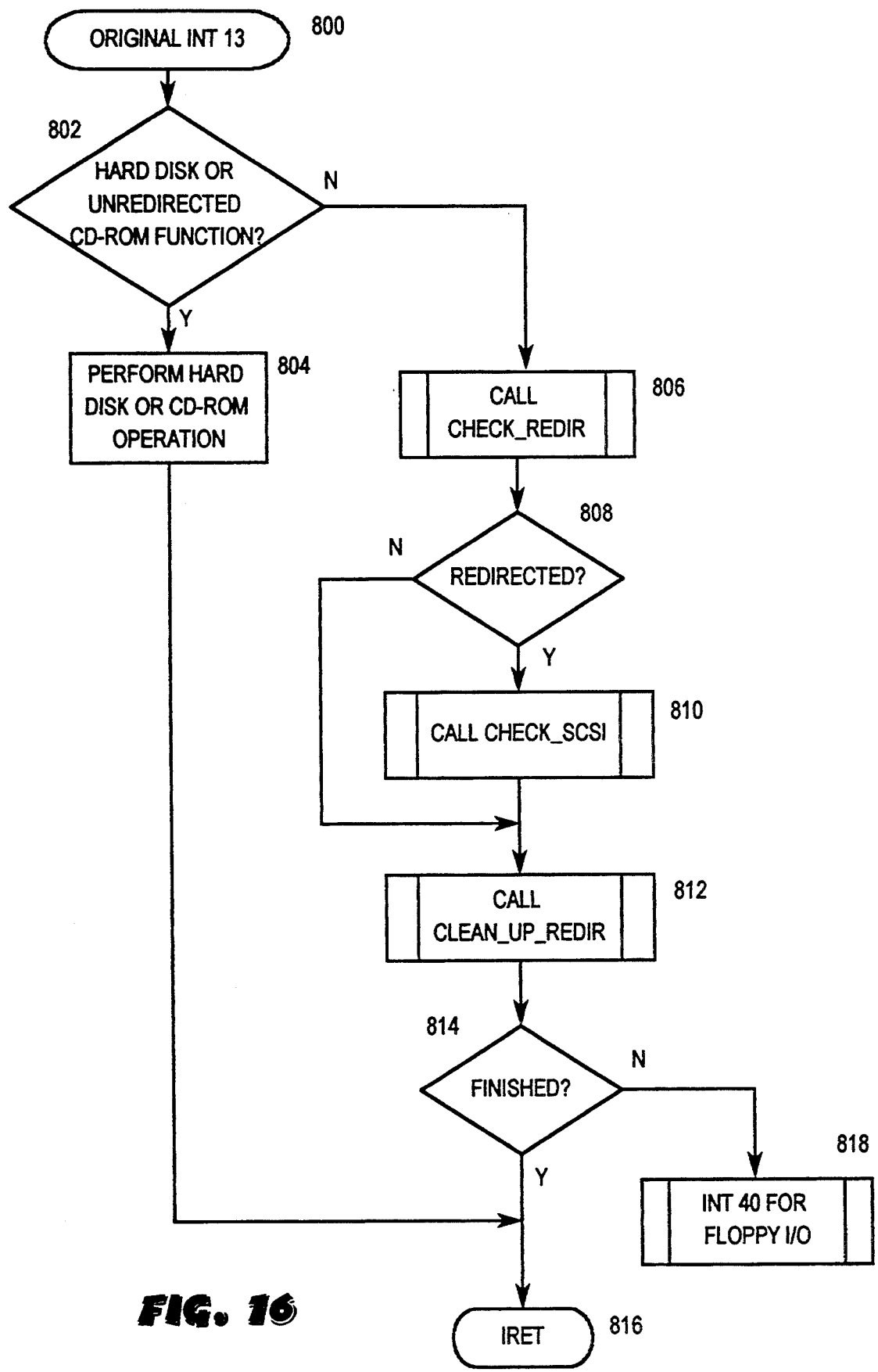

The original INT 13 sequence 800 is illustrated in FIG. 16. The initial step is step 802, where a determination is made whether a hard disk or unredirected CD_ROM function is being requested. If so, control proceeds to step 804 where the hard disk or CD_ROM operation is performed according to conventional operations. If not, control proceeds to step 806 where the CHECK_REDIR sequence 550 is called. Control proceeds to step 808 to determine if redirection is in effect. If so, control proceeds to step 810, where the CHECK_SCSI sequence 650 is called. After step 810 or if there is no redirection, control proceeds to step 812 where the CLEAN_UP_REDIR sequence 600 is executed. Control then proceeds to step 814 to determine if the INT 13 operation is finished. If so, control proceeds to step 816, which is an interrupt return. This is also where operation proceeds after step 804. If the floppy drive command had not been finished in step 814, control proceeds to step 818 which is an INT 40 call to perform the actual floppy I/O operation. In the preferred embodiment the actual floppy drive sequences are transferred to INT 40 to ease operations. Thus in this manner the INT 13 sequence 800 and the AUX_INT13 sequence 350 can both perform floppy operations by simply doing an INT 40.

It has been noted above the CD-ROM contains a particular boot record and in the boot record there is boot code which is used to locate the proper floppy drive image and to commence loading of the floppy drive image. This routine also sets the redirection value if redirection is being used for the boot process to continue from the CD-ROM. The BOOT RECORD sequence 850 begins at step 852, where the boot record code is moved to a new address so that it is not overwritten in later steps. Control then proceeds to step 854, which is a jump to the moved code. Control then proceeds to step 856, which is an INT 13 call to read a 512 byte sector from the CD-ROM and effective cylinder 0, sector 1, head 2, to memory location 0:7C00h. This is a request for the primary volume descriptor, which contains as one of its components the volume size of the primary volume space. Control then proceeds to step 858, where an INT 13 call is requested to ID the floppy drive. As noted above, in the CHECK_REDIR sequence this operation will actually be directed to the floppy drive to return its proper size. Control then proceeds to step 860 to determine if it is a 1.44 MB floppy drive. If so, control proceeds to step 862 where the 1.44 MB floppy image size is subtracted from the volume size as determined in step 856. If it is not a 1.44 MB floppy drive in step 860, control proceeds to step 864 to determine if the floppy drive is a 1.2 MB floppy drive. If so, control proceeds to step 866, where the image sizes of the 1.2 and 1.44 MB floppy drives are subtracted from the volume size. The subtraction of both is appropriate as the 1.2 MB floppy image is located prior to the 1.44 MB floppy image in the primary volume space. If it was not a 1.2 MB floppy drive, control proceeds to step 868 where an error message is indicated and machine operation is completely halted until it is again reset. This is considered proper as in the preferred embodiment the floppy image sizes are not present for 720 k or 360 k byte floppy drives. After the subtraction of step 862 or 866, control proceeds to step 870, where the subtraction result is stored as the redirection value in the EBDA. This serves the double purpose of indicating activation of redirection and providing the floppy image address. Control then proceeds to step 872 to perform an INT 13 operation to cylinder 0, sector 1, head 1 for one 512 byte sector from the CD-ROM which sector is to be store at address 0:7C00h in the memory. It is noted as discussed above because redirection is indicated the SCSI code will add the redirection value in the EBDA to any value indicated in an INT 13 request to a floppy to perform the proper offset to the requested floppy image. In this manner, this is effectively a request for the boot record from the floppy image, which is then loaded to the boot record location. Control proceeds to step 874, which is a jump to 0:7C00h to continue with the booting process now that the boot loader has been loaded from the floppy image. This effectively completes operation out of the ROM code and the computer system C is now executing out of code provided in the floppy image. In step 876 the boot sector code will continue operations by loading MS-DOS and the CD-ROM extensions MSCDEX and will prepare for their operation. Control then proceeds to step 878 to transfer operation to MS-DOS and clears the redirection value in the EBDA so that references to the floppy drive are no longer redirected and the floppy drive can be fully utilized. Then in step 880 the application program is executed. The boot code is developed by the CD-ROM developer and is readily organized to add the redirection clearing to its normal loading functions.

Figure 17:
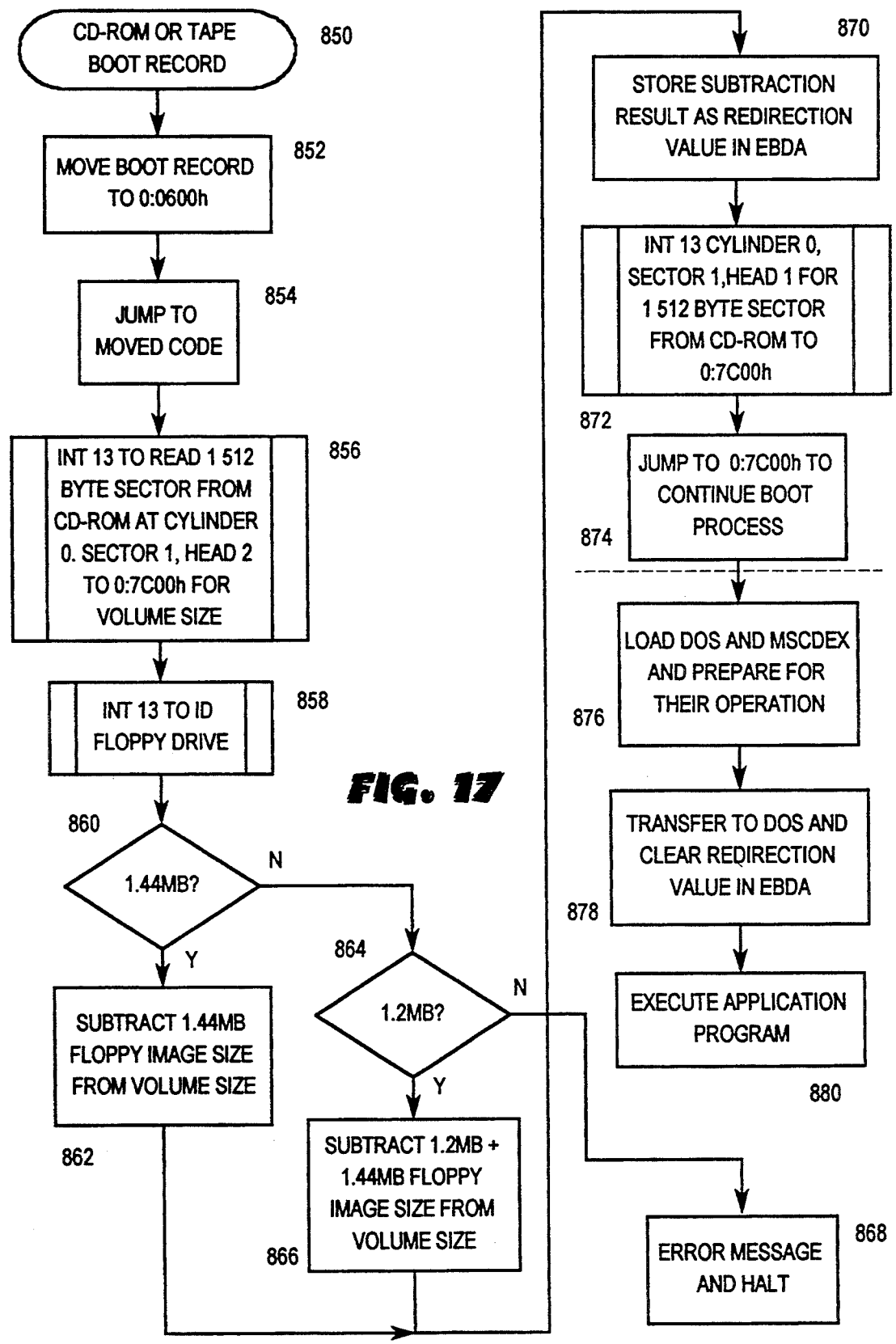
FIG. 17 is a flowchart of the boot code contained in the boot record.

Thus to briefly review, preferred standard boot order is floppy drive, CD_ROM and hard drive, so to boot from CD_ROM the operator does not insert a floppy disk. The desired CD-ROM is placed in the CD-ROM drive and the computer system C is then reset. Assuming that INT 19 is not hooked, the CHK_GOODBOOT sequence 250 executes. The GET_DRV_NUM sequence 750 will return the floppy drive as the first boot device. The READBOOT sequence 300 executes but does not find a good sector. The GET_DRV_NUM sequence 750 is repeated and provides the CD-ROM drive as the boot device. The READBOOT sequence 300 then executes. It in turn calls the READ_AUX_BOOTRCD sequence 350. This sequence 350 hooks INT 13 to use the AUX_INT13 sequence 500. The CD-ROM drive is reset and the 32 sector search is commenced. Upon reaching the sector containing the new boot record, preferably either 0 or 15, the new boot record is detected and the boot code is retrieved. Control then proceeds back to the CHK_GOODBOOT sequence 250 and further back to step 234 to the RESET sequence. Control then jumps to the boot code, and operation proceeds as shown in FIG. 17. An INT 13 call is made, but is performed by the AUX_INT13 sequence 500 as INT 13 is still hooked. The request is a CD-ROM request, so the CHECK_SCSI sequence 650 reads the CD-ROM at the requested location, and in this case returns the primary volume descriptor. INT 13 is again called, but this time to ID the floppy drive. This is directed in the CHECK_REDIR sequence 550 by not setting the redirection bit so that the original INT 13 code handles the operation and IDs the floppy drive. The location of the floppy image is determined after the drive type is determined. This value is stored to indicate redirection and the floppy image boot record is obtained by an INT 13 call. This time the CHECK_REDIR sequence 550 indicates this is a redirected operation, so that the CHECK_SCSI sequence 650 obtains the boot record. It is noted that in this case the redirection value is used as an offset to obtain the desired sector. With the floppy image boot record retrieved, the retrieved code is then executed. As the booting process proceeds, at some time control is passed to MS-DOS and just before this event the redirection value is cleared, so that the floppy drive again becomes operational. The application or the CD-ROM continues operation and the computer C is booted.

Thus a computer can readily be booted from CD-ROMs which can be developed using available CD-ROM development systems or from tape. The booting process is done without requiring large amounts of specialized code in the computer C or on the boot media.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A method of booting a personal computer system having a CD-ROM drive and a floppy drive from an ISO 9660 compatible CD-ROM, comprising the steps of:

preparing an ISO 9660 compatible CD-ROM having a boot record in an ISO defined system area and floppy disk images in a primary volume space, the boot record containing identification information and boot code and the floppy drive images containing boot code, operating system code, CD-ROM drivers and other code;

determining if the CD-ROM drive is the intended boot device;

scanning a first predetermined number of CD-ROM sectors commencing in the system area until a boot record or volume descriptor terminator is found if the CD-ROM is the intended boot device;

if said predetermined number of sectors is scanned without finding a boot record or if a volume descriptor terminator is found, indicating that the CD-ROM is not available for booting;

if a boot record is found, loading the boot code in the boot record into memory;

responding to floppy drive requests by determining if redirection to the CD-ROM is indicated and redirecting floppy drive requests of a plurality of floppy drive request types to the CD-ROM drive if redirection is indicated and directing all floppy drive requests to the floppy drive if redirection is not indicated; and executing said CD-ROM boot record boot code after loading into memory, and wherein after said CD-ROM boot record boot code is executing, determining the type of floppy drive present in the computer system;

determining the location on the CD-ROM of the floppy disk image corresponding to the type of floppy drive present in the computer system;

indicating redirection of floppy drive requests to the CD_ROM drive;

obtaining the boot code from the floppy disk image after redirection is indicated;

executing said floppy disk image boot code to load an operating system and CD-ROM drivers; and removing the indication of redirection of the floppy drive requests to the CD-ROM drive after loading of the operating system and CD-ROM drivers so that all floppy drive requests are handled by the floppy drive.

2. The method of claim 1, wherein said step of scanning the first predetermined number of CD-ROM sectors commences scanning at the first sector of the CD-ROM.

3. The method of claim 1, wherein said step of responding to floppy drive requests by determining if redirection is indicated directs all floppy drive requests of a type requesting identification of the floppy drive to the floppy drive.

4. The method of claim 1, wherein said floppy disk images are located at the end of the primary volume space on the CD-ROM and said step of determining the location on the CD-ROM of the floppy disk image determines the end of the primary volume space and subtracts a first value if a first floppy disk image is to be used and subtracts said first value and a second value if a second floppy disk image is to be used.

5. A method of booting a personal computer system having a tape drive and a floppy drive from a tape, comprising the steps of:

preparing a tape having a system area followed by a primary volume space, said system area having a boot record and the primary volume space having floppy disk images, the boot record containing identification information and boot code and the floppy drive images containing boot code, operating system code, tape drivers and other code;

determining if the tape drive is the intended boot device;

scanning a first predetermined number of tape sectors commencing in the system area until a boot record or volume descriptor terminator is found if the tape is the intended boot device;

if said predetermined number of sectors is scanned without finding a boot record or if a volume descriptor terminator is found, indicating that the tape is not available for booting;

if a boot record is found, loading the boot code in the boot record into memory;

responding to floppy drive requests by determining if redirection to the tape is indicated and redirecting floppy drive requests of a plurality of floppy drive request types to the tape drive if redirection is indicated and directing all floppy drive requests to the floppy drive if redirection is not indicated; and executing said tape boot record boot code after loading into memory, and wherein after said tape boot record boot code is executing, determining the type of floppy drive present in the computer system;

determining the location on the tape of the floppy disk image corresponding to the type of floppy drive present in the computer system;

indicating redirection of floppy drive requests to the tape drive;

obtaining the boot code from the floppy disk image after redirection is indicated;

executing said floppy disk image boot code to load an operating system and tape drivers; and removing the indication of redirection of the floppy drive requests to the tape drive after loading of the operating system and tape drivers so that all floppy drive requests are handled by the floppy drive.

6. The method of claim 5, wherein said step of scanning the first predetermined number of tape sectors commences scanning at the first sector of the tape.

7. The method of claim 5, wherein said step of responding to floppy drive requests by determining if redirection is indicated directs all floppy drive requests of a type requesting identification of the floppy drive to the floppy drive.

8. A method of booting a personal computer system having a CD-ROM drive, a tape drive and a floppy drive from an ISO 9660 compatible CD-ROM or a tape, comprising the steps of:

preparing either an ISO 9660 compatible CD-ROM having a boot record in an ISO defined system area and floppy disk images in a primary volume space, the boot record containing identification information and boot code and the floppy drive images containing boot code, operating system code, CD-ROM drivers and other code or a tape having a system area followed by a primary volume space, the system area having a boot record and the primary volume space having floppy disk images, the boot record containing identification information and boot code and the floppy drive images containing boot code, operating system code, tape drivers and other code;

determining if the CD-ROM or tape drive is the intended boot device;

scanning a first predetermined number of sectors of the intended CD-ROM or tape commencing in the system area until a boot record or volume descriptor terminator is found if the CD-ROM or the tape is the intended boot device;

if said predetermined number of sectors is scanned without finding a boot record or if a volume descriptor terminator is found, indicating that the CD-ROM or tape is not available for booting;

if a boot record is found, loading the boot code in the boot record into memory;

responding to floppy drive requests by determining if redirection to the CD-ROM or tape is indicated and redirecting floppy drive requests of a plurality of floppy drive request types to the CD-ROM or tape drive if redirection is indicated and directing all floppy drive requests to the floppy drive if redirection is not indicated; and executing said CD-ROM or tape boot record boot code after loading into memory, and wherein after said CD-ROM or tape boot record boot code is executing, determining the type of floppy drive present in the computer system;

determining the location on the CD-ROM or the tape of the floppy disk image corresponding to the type of floppy drive present in the computer system;

indicating redirection of floppy drive requests to the CD_ROM or tape drive;

obtaining the boot code from the floppy disk image after redirection is indicated;

executing said floppy disk image boot code to load an operating system and CD-ROM or tape drivers; and removing the indication of redirection of the floppy drive requests to the CD-ROM or tape drive after loading of the operating system and CD-ROM or tape drivers so that all floppy drive requests are handled by the floppy drive.

9. The method of claim 8, wherein said step of scanning the first predetermined number of CD-ROM or tape sectors commences scanning at the first sector of the CD-ROM or tape.

10. The method of claim 8, wherein said step of responding to floppy drive requests by determining if redirection is indicated directs all floppy drive requests of a type requesting identification of the floppy drive to the floppy drive.

11. The method of claim 8, wherein said floppy disk images are located at the end of the primary volume space on the CD-ROM and said step of determining the location on the CD-ROM of the floppy disk image determines the end of the primary volume space and subtracts a first value if a first floppy disk image is to be used and subtracts said first value and a second value if a second floppy disk image is to be used.

* * * * *